United States Patent [19]

Angele

[11] Patent Number: 4,965,817
[45] Date of Patent: Oct. 23, 1990

[54] DEVICE FOR THE MEASUREMENT OF AN EVENT

[75] Inventor: Georg Angele, Remchingen, Fed. Rep. of Germany

[73] Assignee: Borg Instruments GmbH, Remchingen, Fed. Rep. of Germany

[21] Appl. No.: 145,096

[22] Filed: Jan. 19, 1988

[30] Foreign Application Priority Data

Feb. 2, 1987 [DE]  Fed. Rep. of Germany ....... 3702991

[51] Int. Cl.⁵ ..................... G01D 5/245; H03K 21/00; G01C 22/02
[52] U.S. Cl. ........................................ 377/19; 377/49; 377/51; 377/54
[58] Field of Search ........................ 377/19, 44, 47, 48, 377/29, 52, 56, 24.1, 110, 54, 49, 51; 364/745

[56] References Cited

U.S. PATENT DOCUMENTS

| 3,566,279 | 2/1971 | Kaps | 377/52 |
|---|---|---|---|
| 3,590,224 | 6/1971 | Jakobsberg | 377/56 |
| 3,597,641 | 8/1971 | Leatherhead | 377/56 |
| 3,769,496 | 10/1973 | Thompson et al. | 377/48 |
| 3,811,902 | 5/1974 | Charbonnier | 377/44 |
| 3,872,288 | 3/1975 | Sampey | 377/24.1 |
| 3,876,869 | 4/1975 | Houpt | 377/56 |
| 3,927,305 | 12/1975 | Gruhl | 377/24.1 |
| 4,086,532 | 4/1978 | Aronson et al. | 377/24.1 |
| 4,224,568 | 9/1980 | Guner | 377/48 |
| 4,494,243 | 1/1985 | Elmis | 377/48 |
| 4,550,418 | 10/1985 | Deis | 377/44 |
| 4,803,707 | 1/1989 | Cordan, Jr. | 377/24.1 |

Primary Examiner—John S. Heyman
Assistant Examiner—Tai V. Duong
Attorney, Agent, or Firm—Scully, Scott, Murphy & Presser

[57] ABSTRACT

A device for the measurement of an event or occurrence, including a summing counter which is actuated from a divider circuit. The device includes a divider circuit constituted of a series circuit of counting steps, and wherein a transfer circuit for the counting pulses of the counting steps is arranged intermediate the summing counter and the divider circuit.

3 Claims, 1 Drawing Sheet

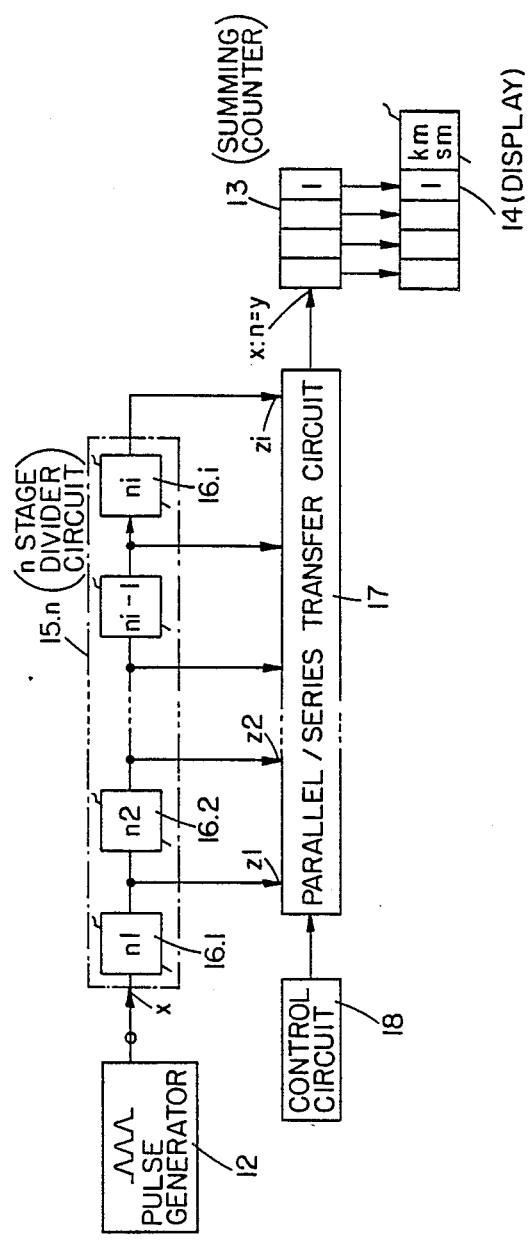

DEVICE FOR THE MEASUREMENT OF AN EVENT

BACKGROUND OF THE INVENTION

1. Field of the Invention

The present invention relates to a device for the measurement of an event or occurrence, including a summing counter which is actuated from a divider circuit.

2. Discussion of the Prior Art

In devices of the type which are under consideration herein, the successive occurrence of the event which is to be measured is characterized by a pulse, and the measurement is implemented through the summation or adding together of the pulses. A typical example is the measurement of a traversed distance, whereby the relative movement is determined through the delivery of a pulse for each unit of distance, and the measured result is digitally determined in a unit of length, for example, in kilometers, and when required, indicated by a display. The correlation between the sensitivity of the receiver and the resolution of the measuring apparatus, or respectively, the display apparatus, is implemented through the intermediary of a divider circuit for the reduction of the pulse sequence which is delivered by the pulse generator for the event; for example, as disclosed in SIEMENS-Baustein 4502 (premliminary divider for a tachometer counter). Should the measured result of the length of the distance increase by about one (length) unit, when due to the traversed distance, the pulse generator for the event has delivered 5000 pulses, there is then required the resulting dividing number 5000 from the preliminary divider.

However, should the same measuring and display device be employed with an unchanged sequence of event pulses for the determination of the lengths of distance in another unit of measurement, then the dividing number must be correspondingly modified. When the different possible units of measurement do not have an integer or whole-numbered relationship to each other, this would then require a complex computing circuit for the division, inasmuch as divider circuits which are simply based on counting functions deliver only integers or whole-numbered dividing numbers.

However, for a change in a display of distances of travel from English miles to kilometers, the required dividing number would be 3107.133398, or for a selective measurement in SM (statue or nautical miles) and in kilometers this would consist of 2699.784; in effect, it could not only be represented as an improper or mixed fraction.

SUMMARY OF THE INVENTION

It is in recognition of these conditions, that the present invention has as its object to create a device of the above-mentioned type which, without any extensive demands on computer technology, will facilitate a precise event measurement in different units of measurement while maintaining the use of pregiven event pulse generator and measuring or display circuits, irrespective as to whether the units of measurement which are of interest do not have an integer or whole-numbered relationship with regard to each other.

The foregoing object is inventively achieved, in that the device pursuant to the type under consideration herein includes a divider circuit which is constituted of a series circuit of counting stages, and wherein a transfer circuit for the counting pulses of the counting stages is arranged intermediate the summing counter and the divider circuit.

The foregoing is predicted on the recognition that dividing numbers which represent mixed fractions can also be realized through simple counting stages and are thereby less complex than would be by means of a computer circuit, when there are not only employed the counting pulses at the end of a series circuit of counting stages for the measurement, but are also evaluated (summed up) behind each of the counting stages. Each counting stage per se thereby delivers only an integer or whole number; namely, the next highest with respect to the required dividing number; the excess in the fraction with regard to the actually intended dividing number; however, is considered along within the following counting stage and, as a result, is not lost. Resulting therefrom is that it becomes only a question of the requirements; in essence, the number of the successively implemented counting stages to suitably precisely approach the intended resulting dividing number, and to thereby carry out the conversion between the different units of measurement in a suitably precise manner; in effect, to be able to precisely determine the measured quantity in a predetermined unit of measurement with the same measuring and display device. The dimensioning of the individual count stages, namely the count volume, is obtained from an approximation of the difference (elucidated hereinbelow). The latest-mentioned can be terminated, the number of counting stages individually connected in series also limited, when the resultant error between the actually realized and the (on the basis of the conversion factors between the units of measurement) sought-after computed dividing number, has become sufficiently small for the necessary measuring task.

A preferred field of application for the inventive measuring device pertains to measuring apparatus for the measurment of distances of travel which, in accordance with the type of utiliztion, should be displayed in different dimensions (units of measurement). For instance, vehicles are uniformly equipped with pulse generators and summing or adding counters for the incremental measurement of the traversed distance of travel; whereby the display of the measurement should be effected on the European continent in kilometers, whereas during operation of the vehicle in the Anglo-Saxo cultural circle, it should be displayed in miles. Inasmuch as the relationship between the values which are to be displayed is not in whole integers (in effect, is an improper fraction), the simple switching over of a preliminary divider operating on a counting basis would lead to considerable, no longer permissible, errors in rounding off in the display of the distance of travel; as a result of which, in actual practice, there must be taken into consideration the extensive demand on apparatus for the mathematical conversion by means of a quotient-computing circuit. However, in accordance with the inventive object, for a conversion in the scale of the display, only the counting volume or value n of the individual counting stages need be changed such that, with a single sequence of count circuits, it is possible to achieve a suitably precise correlation with the computationally required dividing number for the display of the distance of travel in the new units of measurement.

BRIEF DESCRIPTION OF THE DRAWING

Additional alternatives and modifications, as well as further features and advantages of the invention can now be readily ascertained from the following detailed description showing a block circuit diagram for the reduction in the pulse sequence of the event through a chain of dividing steps or stages, whose output signals are transmitted in parallel to a transfer circuit and serially from the latter to a summing or adding counter.

DETAILED DESCRIPTION

A pulse generator 12 for an event or occurrence delivers a number x of pulses in dependence upon the event, whereby the event is such as the traversed distance of travel of a land vehicle or water vessel. The event is measured in a summing counter 13 in a predetermined dimension, and in a display apparatus 14 which may be connected to the output of the counter 13, the measured event, preferably together with the dimension on which the measurment is based, can be optically represented. In practice, a divider circuit 15 is, as a rule, arranged between the event pulse generator 12 and the summing counter 13, so that the measured value y which is determined by the summing counter 13 is obtained as a quotient from the event pulse count x as the divider and resulting dividing number n of the circuit 15 as the divisor.

In the counting example as illustrated in the drawing, the event pulse generator 12 delivers over a distance of one SM (nautical miles) x=5000 pulses, which are reduced in the divider circuit 15 to y=1 actuating pulse(s) for the summing counter 13, so as that this will switch forward y by the unit of one nautical mile; in effect, the display apparatus 14 which is connected to the output thereof, will indicate the additional traversed distance of one statue or nautical mile.

However, when the same event pulse generator 12 and the same summing counter 13 are to be employed such that the distance of travel is to be measured and displayed not in nautical or statue miles (heavily-drawn dimensional indication in the display apparatus 14), but rather in kilometers (finely-drawn dimensional indication in display apparatus 14), then the dividing number n in the divider circuit 15 must be modified in conformance with the reconversion factor between kilometers and nautical miles. This given conversion factor necessitates that not only first after x=5000 pulses (for the nautical mile display) but already after x=2,699.784 pulses should the summing counter 13 or, in effect, its display apparatus 14, switch forward by one unit (now in the dimension "kilometers").

The following TABLE indicates the numerical indication of the dividing factors and the resulting display error for the exemplary case in the switching over of a magnitude from nautical miles to kilometers, such as would be of general interest in connection with cartographic tasks.

TABLE $x = 5000 \quad y = 1sm \rightarrow n1 = 5000; f = 0\%$
$x = 2699{,}784 \quad y = 1km \rightarrow n1 = 2700, n2 = 12\,500$

TABLE-continued $f(i = 2) = 0\% \rightarrow n = 2699, 784$ $$n = \frac{\overset{i}{\underset{1}{\pi ni}} + \overset{i}{\underset{2}{\pi ni}} + \ldots + ni + 1}{\frac{i}{\underset{2}{\pi ni}}}$$

$$n1 = INT\{n + 1\}$$

$$n2' = \left(\frac{1}{n} - \frac{1}{n_1}\right) \cdot n_1$$

$$n2 = INT\left\{1 + \frac{1}{n2'}\right\}$$

A divider circuit 15 of the type considered herein is usually constructed as a modulo-n counter; in essence, as a counter which upon reaching its counting capacity n, will emit an output pulse as a counting pulse z to the summing counter 13, and upon a further actuation at the input, again commences to count from the beginning. However, as in the present example, when the reduction in the pulse frequency between the event pulse generator 15 and the summing counter 13 produces a mixed fraction instead of an integor or whole number, then as mentioned, for this defined reduction there is usually required a complete division computing circuit, inasmuch as otherwise (upon the mere consideration of the integer or whole-numbered reduction component) the unconsidered fraction remaining during the modular reduction, would be summed together over a larger measuring interval (for example, over an extremely lengthy distance of travel) into an impermissibly large error. However, it is disadvantageous that a computing circuit for the implementation of the division with a significant demand on apparatus, will nevertheless require a not completely negligible computing period, which again hinders a high accuracy or resolution in the results of the measurement.

As a result thereof, in accordance with the present invention, the divider circuit 15 is not constituted as a computing mechanism, but is implemented as a series circuit of usual modulo-counting steps or stages 16.i, whose individual counting pulses zi are switched to the summing counter 13. As is indicated in the drawing by the setting or calibrating symbol, the individual counting stages 16.i are presettable to variable counting capacities, when the respective divider circuit 15 should be constructed for different resultant dividing numbers n in conformance with certain dimension-converting options.

Because of the extremely differently possible dividing numbers ni for the original counting stages 16.i, it cannot be precluded that a few of the counting pulses zi will be emitted either concurrently or will overlap each other. In order to ensure that, nevertheless, all emitted counting pulses zi will still be detected by the summing counter 13, there is provided a transfer circuit 17 which has the function of a parallel-series converter. Consequently, for this purpose, it can be simply constructed as a slide register into which, during a working cycle, there are read-in the counting pulses zi and, at the end of the working cycle, are read-out serially to the summing counter 13. The working cycle and the reading-out of the slide register can be controlled from the pulse generator 12; however, for purposes of clarification in the drawing, there is herein provided an automatically-operating control circuit 18, which periodically permits the slide register to pass through one time for the reading-out and erasing of its accumulated content.

The function of the series circuit of the counting steps or steps 16.i and the summing of their individual counting pulses zi is a resulting dividing number n, such as indicated in the drawing, is also representable as a quotient of the sum of a product and a product with dividing numbers ni. Broadly expressed, this signifies that each of the counting steps or stages 16.i which are realized as modulo-ni-counters can, namely, deliver only their whole-numbered or integer addition to the resulting dividing number n, but that the therein contained excess fraction is detected by the following counting stages 16.i+—, and is thereby overall considered. Resulting therefrom is that the formation of the quotient is correlated more precised to the ratio between the measured magnitudes; and the resultant error f becomes smaller relative to the result of the exact mathematical division, the more of such counting stages 16.i are connected in sequence within the divider circuit 15, and are read-out across the transfer circuit 17 on the summing counter 13. With an increased demand on the accuracy of the results of the measurement, merely the actually attained resulting dividing number n must be further correlated with computationally-determined required dividing number, for which there must merely be provided a larger number of correspondingly dimensioned counting stages 16.i. As a result, there is present a direct connection between the required accuracy and the technological constructional requirements necessary for this purpose; in effect, between accuracy and the thereby constantly increasing costs. In the numerically representative embodiment; however, by chance there is ascertained that the already indicated series of two counting steps or stages 16.1 and 16.2 produces a resulting dividing number n which practically coincides with the necessary dividing number n, so that the resulting error f already becomes zero.

The determination of the individual dividing numbers ni of the counting stages 16.i is also indicated in the Table hereinabove. The first counting stage 16.1 is preset to a counting volume n1 in conformance with the next-higher whole-numbered component in contrast with the intended dividing number n which is representable as a mixed (decimal) fraction. The subsequent counting stage 16.2 has a counting volume n2, which corresponds to the next higher ("+1") integer or whole-numbered component ("INT"of the inverse value of the product from the actually precedent dividing number n1 and the difference of the inverted values from the previously intended (n) and the actually given (ni) dividing number; and so forth, for any possibly required additional counting stages 16.i.

The actual construction of the inventive arrangement, as illustrated, can be readily implemented through a few standard modules or components from the digital circuitry technology and, consequently, is especially adapted for the complete integration as a universal preliminary divider for certain tasks within the broad scope of the above-described art. Should a microprocessor be already available; for example, for the preparation of event or occurrence data, then the microprocessor can also assume the counting and output functions of the required tasks.

What is claimed is:

1. A measuring circuit for an event which is to be measured and characterized by a series of measuring pulses, including a divider circuit comprising a series of counter stages for counting the measuring pulses, wherein said counter stages are individually settable to different counting values at which they produce an overflow, with the first counter stage receiving the measuring pulses as an input, and each subsequent counter stage receiving the overflow output of the previous counter stage, a summing counter for counting the overflow outputs of all of the counter stages, which are transferred thereto by a transfer circuit coupled between the input of said summing counter and the overflow outputs of the counter stages of said divider circuit.

2. A measuring circuit as claimed in claim 1, wherein said transfer circuit comprises a parallel-series shift register converter circuit.

3. A measuring circuit as claimed in claim 1, wherein display apparatus is coupled to the output of said summing counter.

* * * * *

UNITED STATES PATENT AND TRADEMARK OFFICE
CERTIFICATE OF CORRECTION

PATENT NO. : 4,965,817
DATED : October 23, 1990
INVENTOR(S) : Georg Angele

It is certified that error appears in the above-identified patent and that said Letters Patent is hereby corrected as shown below:

Column 2, line 30: "latest" should read as --last--

Column 2, line 50: "Saxo" should read as --Saxon--

Column 3, line 67: after "5000" add "∧"

Column 3, line 68: after "2699,784" add "∧"

Column 4, line 25: "integor" should read as --integer--

Column 5, line 16: "precised" should read as --precisely--

Column 6, line 4: "("INT" of" should read as --("INT") of--

Signed and Sealed this

Eighteenth Day of February, 1992

Attest:

HARRY F. MANBECK, JR.

*Attesting Officer*      *Commissioner of Patents and Trademarks*